US012267645B1

(12) United States Patent
Faundez Hoffmann et al.

(10) Patent No.: US 12,267,645 B1
(45) Date of Patent: Apr. 1, 2025

(54) ACOUSTIC-FEEDBACK-INFORMED FAR-FIELD BEAMFORMING

(71) Applicant: Meta Platforms Technologies, LLC, Menlo Park, CA (US)

(72) Inventors: Pablo Francisco Faundez Hoffmann, Kenmore, WA (US); Francesco Nesta, Aliso Viejo, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 224 days.

(21) Appl. No.: 18/086,860

(22) Filed: Dec. 22, 2022

Related U.S. Application Data

(60) Provisional application No. 63/392,964, filed on Jul. 28, 2022.

(51) Int. Cl.
*H04R 1/40* (2006.01)

(52) U.S. Cl.
CPC .................................... *H04R 1/406* (2013.01)

(58) Field of Classification Search
CPC ...... H04R 1/326; H04R 1/406; H04R 25/405; H04R 25/407; H04R 2410/01; G10K 2210/506
See application file for complete search history.

(56) References Cited

U.S. PATENT DOCUMENTS

2017/0180879 A1* 6/2017 Petersen .............. H04R 25/453
2021/0092530 A1* 3/2021 Thomsen ............... H04R 25/50
2023/0336926 A1* 10/2023 Hertzberg ............ H04R 25/405

* cited by examiner

*Primary Examiner* — Jason R Kurr
(74) *Attorney, Agent, or Firm* — Weaver Austin Villeneuve & Sampson LLP

(57) ABSTRACT

An audio system controls feedback when beamforming an output for production by transducers by generating a beamforming output signal based on audio from a first set and a second set of acoustic sensors. The first set may include acoustic sensors that may experience feedback from the transducers. The second set may exclude the acoustic sensors that cause feedback. The beamforming output from each set are combined as a weighted combination based on a beamforming coefficient that may be dynamically set to increase contribution of the first set until the combined output causes feedback, enabling the total beamforming output to benefit from a larger set of acoustic sensors while avoiding detrimental feedback. The interaural characteristics of the external environment may also be analyzed and the beamforming output modified to increase a difference in the interaural characteristic and thereby increase perception of the beamforming output.

20 Claims, 6 Drawing Sheets

ACOUSTIC-FEEDBACK-INFORMED FAR-FIELD BEAMFORMING

CROSS-REFERENCE TO RELATED APPLICATIONS

This application claims the benefit of U.S. Provisional Application No. 63/392,964, filed Jul. 28, 2022, which is incorporated by reference.

FIELD OF THE INVENTION

This disclosure relates generally to minimizing acoustic feedback, and more specifically to acoustic-feedback-informed far-field beamforming.

BACKGROUND

Devices with acoustic sensors (e.g., microphones) near transducers (e.g., loudspeakers), particularly in size-constrained devices, such as glasses, can be highly sensitive to acoustic feedback when the loudspeaker is used to enhance, in real time, sounds captured by the acoustic sensors. An original sound from the environment may be reproduced by the transducer, and the reproduced sound may be captured by the acoustic sensor as an additional sound to be reproduced, and in severe cases this feedback creates a loud "howl" from the transducer. When using the audio for beamforming to reproduce particular sounds from a sound source or direction in the environment, it may also be undesirable to completely filter or mask the reproduced sound, as this may prevent effective beamforming. One approach to mitigate acoustic feedback is to only use device microphones that are far enough from the device loudspeaker so that their physical distance prevents feedback from building up while enabling the reproduction of a beamformed signal. However, this approach either prevents acoustic sensors from being placed near the transducer array or results in information loss from the acoustic sensors near the transducer array and may reduce beamformer performance relative to the performance of the complete set of acoustic sensors.

SUMMARY

Acoustic-feedback-informed far-field beamforming via an audio system is described herein. The audio system may be integrated into a wearable device (e.g., a headset—which may be augmented reality (AR) glasses). The audio system includes a transducer array (e.g., loudspeakers), an acoustic sensor array (e.g., a microphone array), and a controller. For devices with a relatively small form factor, there may be acoustic sensors of the acoustic sensor array that are close enough to transducers of the transducer array such that unless mitigated (as described herein), under certain conditions acoustic feedback occurs (i.e., reproduction of sound from the acoustic sensors creates a positive gain and may result in a "howl" in the transducers). To address the potential for acoustic feedback when beamforming, the controller uses a detected level of feedback to moderate the respective contribution (e.g., with a beamforming coefficient) of beamforming from a set of the acoustic sensors (which may include sensors that can contribute to feedback) and a subset of the acoustic sensors (which may exclude acoustic sensors that contribute to feedback (e.g., above a threshold)).

In addition, the controller may enhance a hearer's perception of the signal by increasing a difference in an interaural characteristic (e.g., a coherence) of an output audio signal relative to the environment (e.g., background noise). This may enhance target audio (e.g., beamformed speech from a sound source) without simply amplifying the output audio signal. The perception may be enhanced by determining an interaural characteristic of the received audio signal and modifying the output audio signal to increase a difference of the interaural characteristic of the output audio signal relative to the received audio signal. This may modify the phase of the output audio signal for different speakers such that the output audio signal is out of phase relative to the background noise, which may increase perception of the output audio signal for a user.

Figure 1A:
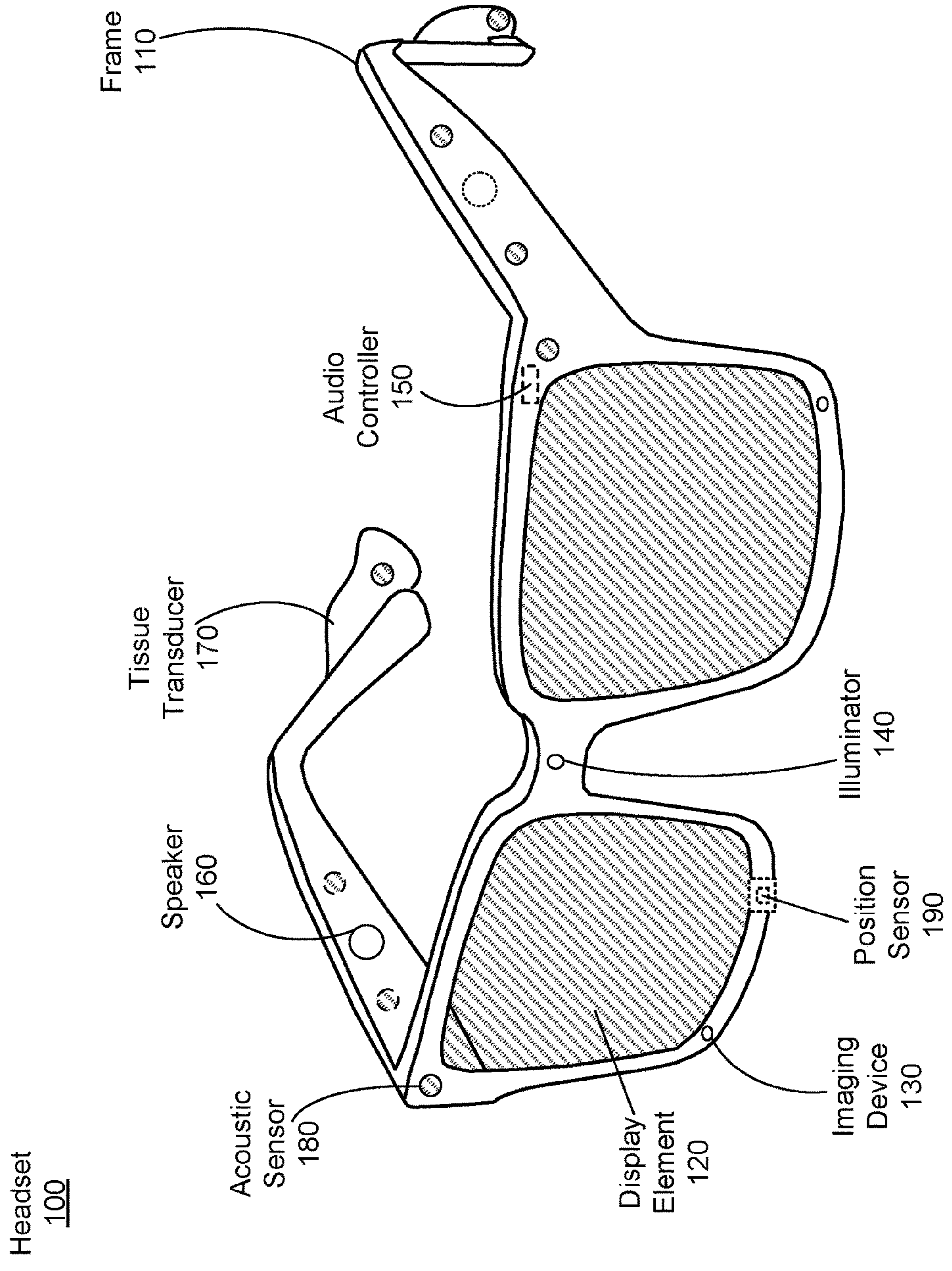
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio device beamforms audio data captured from acoustic sensors and reproduces the beamformed data with a transducers. The audio device may beamform data from a desired speaker or sound source, such that the beamforming enhances audibility of the output audio signal of the speaker to the user. Some of the transducers may be near to the acoustic sensors and may create feedback when those acoustic sensors are used in the beamforming. To improve beamforming without losing data that may otherwise be present in audio captured from the sensors, a controller of the audio device monitors the level of feedback and controls a beamforming coefficient that controls the contribution of beamforming information from a plurality of acoustic sensors (e.g., all acoustic sensors) and a subset of acoustic sensors (e.g., omitting sensors that contribute to the feedback, such as those near any of the transducers).

In some embodiments, the controller monitors the amount of feedback received from the acoustic sensors based on the output audio signal. The controller may generally increase the beamforming coefficient to increase the contribution of the plurality of acoustic sensors (e.g., the complete set of acoustic sensors) without creating accumulating feedback. In general, increasing the beamforming coefficient increases the contribution of beamforming from the plurality of acoustic sensors (and decreases the contribution of beamforming from the subset of acoustic sensors). The controller may thus monitor the level of feedback and increase the beamforming coefficient until feedback is detected (e.g., produces a gain that would create a positive feedback loop). When undesirable feedback is detected, the controller may automatically reduce the beamforming coefficient below a level at which the undesirable feedback is detected, enabling the beamforming coefficient to dynamically vary the contribution of the plurality of acoustic sensors to the final beamforming output.

In addition, or as an alternative, an output audio signal may be modified to enhance perception of the output audio signal. For many listeners, an interaural contrast increases perception of a signal relative to noise, which may be described as a "masking level difference" between the signal and the noise as perceived by a listener. To do so, the controller may determine one or more interaural characteristics of a local area (which may also be termed an "environment") (e.g., based on received audio from the acoustic sensor array) and modify the interaural characteristics of the output audio signal to increase a contrast of the output audio signal with respect to the local area.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180 (e.g., microphones). An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 may use the beamforming to reproduce sound in the direction of the sound sources to aid in distinguishing sound originating from the sound source. As further discussed below, the audio controller may use a beamforming coefficient to weigh beamforming outputs generated based on different sets of acoustic sensors (e.g., a set of all acoustic sensors and a subset that has no or reduced feedback). The beamforming coefficient may be set to enable use of the beamforming with a larger number of acoustic sensors without generating feedback by dynamically adjusting the beamforming coefficient. The audio controller may also modify an interaural characteristic of the output signal based on the interaural characteristics of the environment. Each of these is further discussed below.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
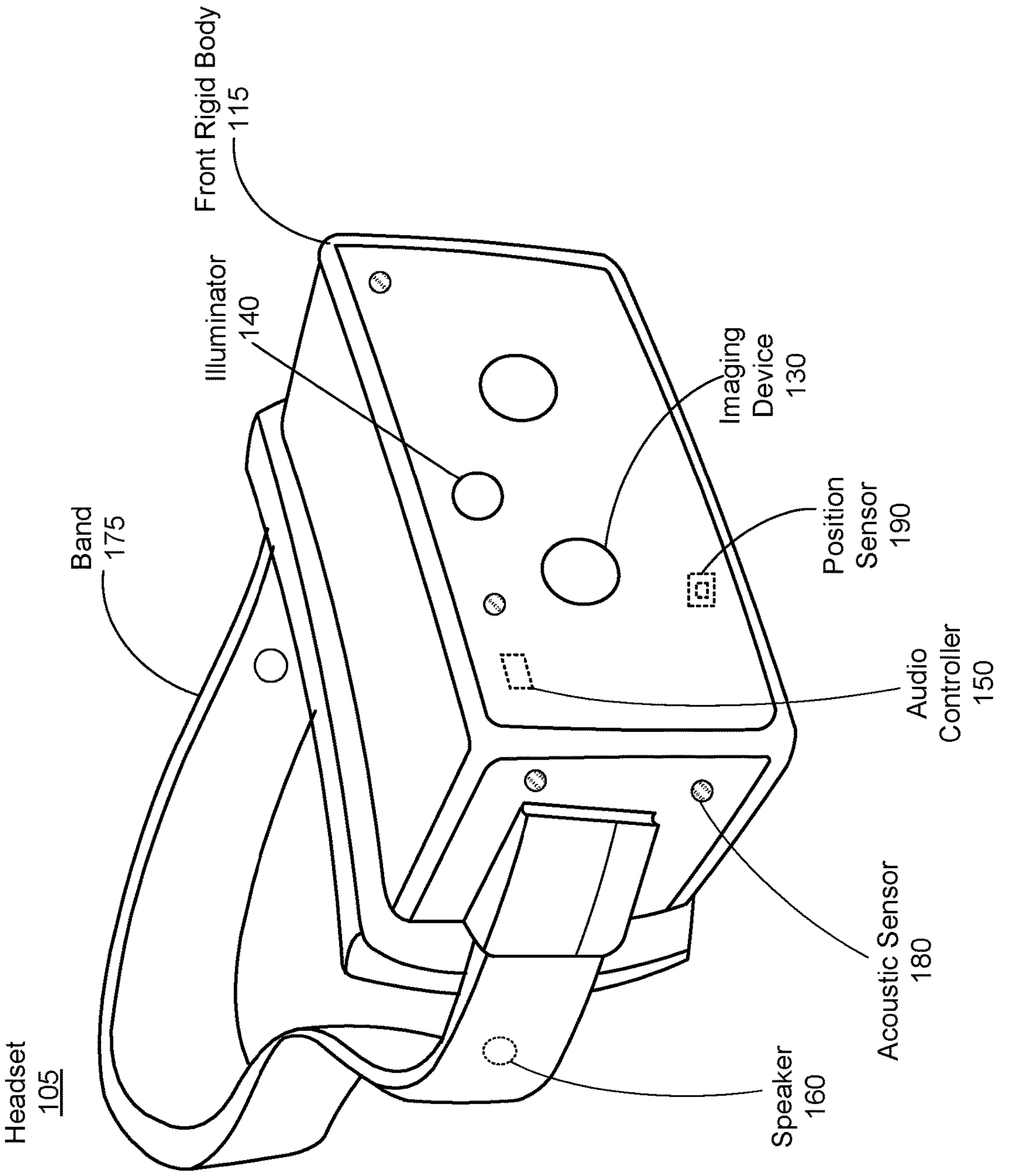
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
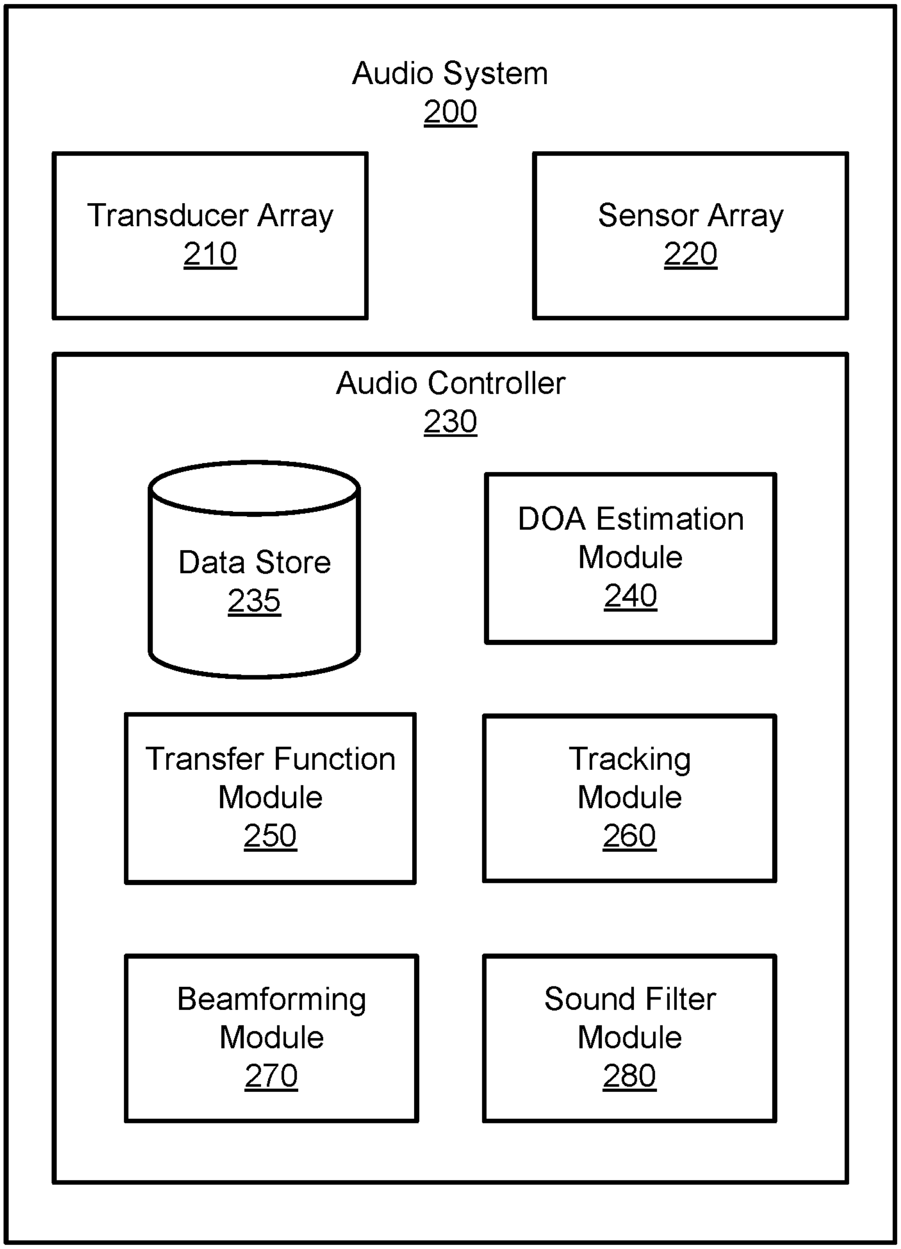
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here. In various embodiments, the audio controller may produce output signals with the transducer array 210 including a beamforming signal as may be generated by the beamforming module 270 discussed below. In some embodiments, one or more acoustic sensors in the sensor array 220 may be sufficiently proximate to the transducer array 210 such that sounds produced by the transducer array 210 may create feedback when received by the sensor array 220 and processed to generate further signals for output by the transducer array 210. The beamforming module 270 may account for these signals by determining a contribution from different sets of sensor arrays 220 in the generation of the beamformed output signal to maximize beamforming accuracy while preventing feedback from distorting the output. Further details are discussed below with respect to the beamforming module 270 and FIGS. 3-5.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area. The plurality of acoustic sensors may some sensors near one or more of the transducers, such that they may receive audio generated by the transducer array 210, and other acoustic sensors that are relatively remote from the transducers and have a position and orientation such that these acoustic sensors generally are not affected by the transducer array 210.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 may be personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220. The beamforming module 270 performs far-field beamforming based in part on detected levels of acoustic feedback. The beamforming module 270 is configured to monitor sound that was detected using a plurality of microphones and may use the detected feedback to modify beamforming of sound detected by the plurality of microphones to optimize beamforming information while preventing acoustic feedback. In particular, the beamforming module 270 may beamform from a first set of acoustic sensors that may include acoustic sensors that may create feedback and also beamform from a second set of acoustic sensors (e.g., a subset of the first set) that does not include any acoustic sensors that may create feedback. The beamforming module 270 may use a beamforming coefficient to determine an output audio signal as a weighted combination from beamforming of the set and the subset of acoustic sensors. In addition, or alternatively, the beamforming module 270 may modify the output audio signal based on an interaural characteristic of the environment. Further details are shown and discussed with respect to FIGS. 3 and 4.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters.

The sound filter module 280 provides the sound filters to the transducer array 210. In some embodiments, the sound filters may cause positive or negative amplification of sounds as a function of frequency.

Figure 3:
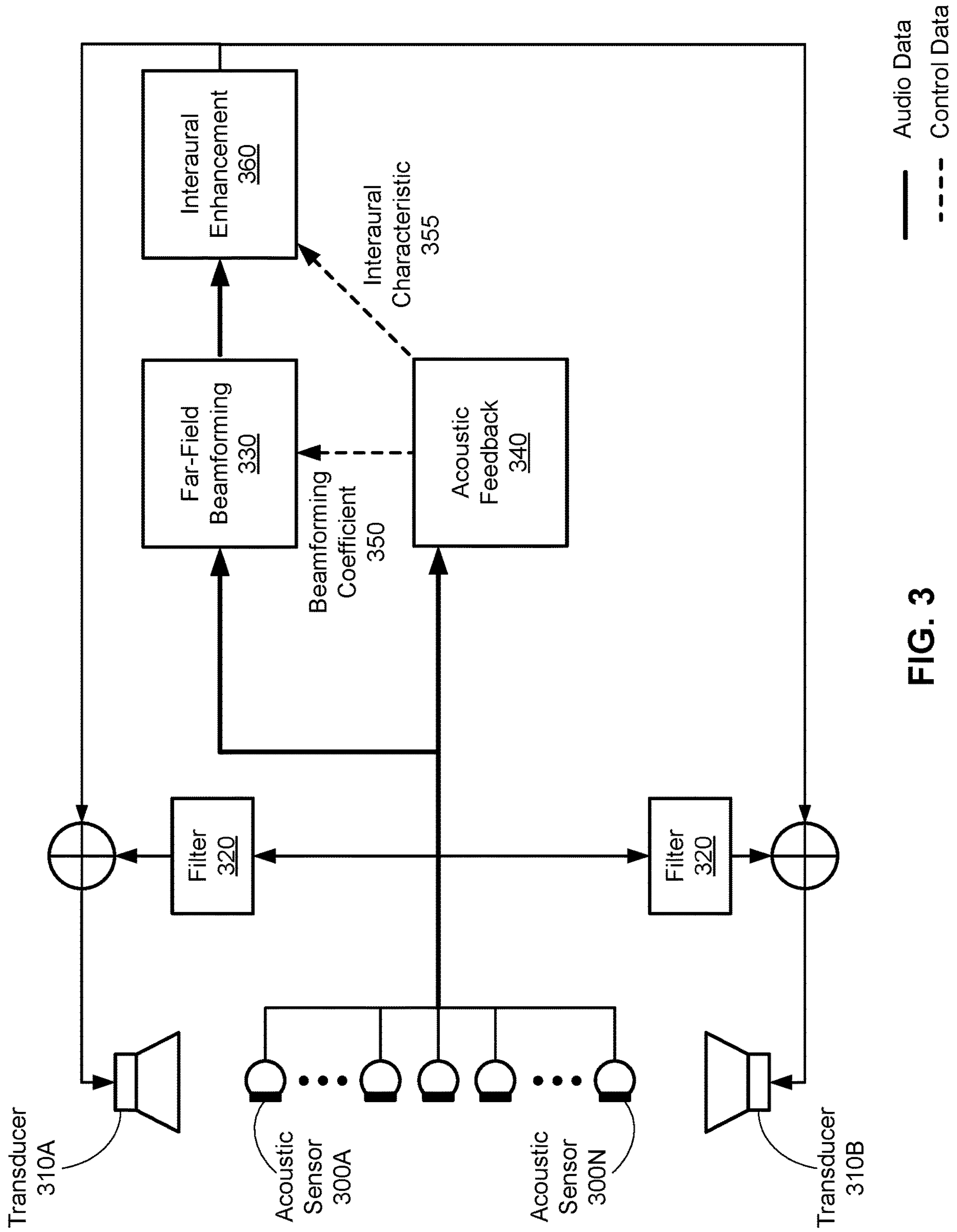
FIG. 3 shows an example data and control flow for beamforming with feedback control, according to one embodiment.

FIG. 3 shows an example data and control flow for beamforming with feedback control, according to one embodiment. As discussed above, a sensor array may include a set of acoustic sensors 300A-N that receive audio data from the local area. Transducers 310A-B may be used to present audio to the user that enhances audio content received by the acoustic sensors 300A-N. For example, one or more filters 320 may be used to transform audio information received from the acoustic sensors to the user, for example as discussed with respect to the sound filter module 280. In addition, beamforming may be used to emphasize individual sounds as discussed with respect to the beamforming module 270. The beamforming module 270 (and/or the audio controller 230 generally) may include components implementing functions for far-field beamforming 330, acoustic feedback 340, and interaural enhancement 360. To account for the potential feedback from audio from the transducers 310A-B (which may be received by some of the acoustic sensors 300) that may affect the beamforming, acoustic feedback 340 may be determined to evaluate feedback from one or more of the acoustic sensors 300 and other characteristics of the received audio information to generate a beamforming coefficient 350 and an interaural characteristic 355 from the received audio as further discussed below.

The beamforming coefficient 350 is used to determine a weighted contribution from a first beamformed signal from a first set of acoustic sensors and a second beamformed signal from a second set of acoustic sensors. The first set of acoustic sensors may include all of the acoustic sensors 300A-N, and the second set is typically a subset of the first set. The second set of acoustic sensors (e.g., as a subset of the first set) may be determined by excluding the acoustic sensors of the first set that may provide feedback from audio produced by the transducer array. In one embodiment, the subset of acoustic sensors may be fixed during operation of the audio system, for example as determined by a designer based on the placement of the acoustic sensors or determined by testing the physical arrangement of acoustic sensors 300 and transducers 310. In other embodiments, the audio controller 230 (e.g., via the beamforming module 270), is configured to select a subset of the set (e.g., the plurality of acoustic sensors) based on sound detected by the subset having acoustic feedback below a threshold value. In this embodiment, the selected subset may be dynamically selected, such that the selection of the subset at any particular time may include only those acoustic sensors with limited or no potential for creating a positive feedback gain.

Formally, the acoustic array may include N microphones that form a first set x of acoustic sensors, where N is an integer greater than 1. The beamforming module 270 may analyze signals from the acoustic sensors of x to determine levels of acoustic feedback at each of the microphones in x (e.g., as determined by acoustic feedback 340). In one embodiment, the audio controller 230 selects the second set z as a subset of the set x that includes M number of acoustic sensors (where M is a whole number that is less than N). The controller selects the acoustic sensors in the second set z based on which of the acoustic sensors in x have a level of acoustic feedback that is below a threshold value (e.g., such that the M acoustic sensors have substantially no acoustic feedback). This may be due, in part, to where the microphones are placed on the wearable device relative to the speakers of the speaker array. For example, the microphones in z may be farther from the speakers of the speaker array than the other microphones that are not in z. As noted above, in some embodiments the first set x and second set z may be previously determined, for example defined by a designer of the device based on the configuration and placement of the transducer array and sensor array. The acoustic feedback 340 may also be used to determine a level of feedback for the sensors as a whole to determine the beamforming coefficient 350 as further discussed below.

For each set of acoustic sensors, the first set x and the second set z, far-field beamforming 330 is applied to generate respective beamformed signals as outputs. The far-field beamforming 330 of the sound detected by the microphones in x forms a first beamformed signal, denoted $y_1$, and of the sound detected by the microphones in z forms a second beamformed signal, denoted $y_2$, as shown in Equations 1 and 2, where:

$$y_1 = BF(d_1, x) \quad \text{Equation 1}$$

$$y_2 = BF(d_2, x) \quad \text{Equation 2}$$

In which $d_1$ and $d_2$ are acoustic transfer functions, and $d_1=[1, a_1, a_2, \ldots a_N]$, and $d_2=[1, b_1, b_2, \ldots b_M]$, where a and b are the coefficients of the relative/acoustic transfer function for the constituent acoustic sensors normalized by the first element (i.e., representing the transfer function between a certain direction and the acoustic sensor of the set used as reference).

The signal $y_1$ is the output of a beamformer (BF) which is designed to process all the available N microphones to enhance the sound source identified by the acoustic transfer function $d_1$. The signal $y_2$ is the output of a BF which is designed to process only a subset of M microphones $z \in x$ to enhance the source identified by the acoustic transfer function $d_2$. The acoustic transfer function $d_1$ (and $d_2$) indicates the transfer functions between the sets of acoustic sensors x (and z) for the same sound source location to be enhanced. An example of BF implementation can be obtained using a minimum variance distortionless response (MVDR) design where the BF coefficients are computed as:

$$W_1 a = \frac{P_{nn}^{-1} d_1}{d_1^H P_{nm}^{-1} d_1}, \text{ and } W_2 = \frac{Q_{mm}^{-1} d_2}{d_2^H Q_{mm}^{-1} d_2} \quad \text{Equation 3}$$

Where $P_{nn}^{-1}$ is a noise covariance matrix computed with the N microphones, $Q_{mm}^{-1}$ is the noise covariance matrix computed with the M microphones.

In some embodiments, the final beamformed output is determined by weighting the first beamformed signal and the second beamformed signal to mitigate acoustic feedback. The controller weights the first beamformed signal by a beamforming coefficient α, a tuning parameter, and the second beamformed signal by (1−α). In this example, a higher beamforming coefficient increases the contribution by the set of acoustic sensors that may include acoustic sensors subject to feedback (i.e., the first set) and decreases the contribution by the set of acoustic sensors that exclude acoustic sensors that may introduce feedback. The beamforming coefficient α functions to trade spatial focus and robustness with an amount of acoustic feedback, where $0 \leq \alpha \leq 1$ and α is a real number. The value of the beamforming coefficient may be determined based on feedback from the acoustic sensors. In some embodiments, α is manually set by a user of the wearable device. The beamforming coefficient may also be automatically set (e.g., dynamically based on conditions) based on the detected feedback.

In general, it may be preferable to maximize the contribution of the first set of acoustic sensors, such that the beamforming may benefit from maximum informational value from a larger set of acoustic sensors. In one embodiment, the acoustic feedback 340 includes analyzing the feedback to set the beamforming coefficient 350 at a level that avoids feedback. While feedback is detected, the beamforming coefficient 350 is set reduced towards zero. When feedback is not detected, the beamforming coefficient 350 may be increased towards a maximum value (e.g., one). The maximum value may be determined with offline tuning (taking into account the acoustic and insertion gain). Stated another way, the beamforming coefficient may be dynamically adjusted to maximize the first beamformed signal (from the first set of acoustic sensors) while avoiding feedback (e.g., to keep the detected feedback below a threshold level that may create a positive gain). In one example, the beamforming coefficient may be increased until feedback is detected (e.g., it reaches a threshold feedback level), and then reduced to a level below the feedback is detected.

Then, after generating the beamformed signals, the far-field beamforming 330 weights the signals and combines the weighted first beamformed signal and the weighted second beamformed signal to form an output audio signal. The overall output audio signal y is then sent for playback by the transducers (optionally with additional interaural enhancement 360 and in combination with output from filters 320). The output audio signal which is reproduced by an audio system is obtained as a convex combination of the beamforming outputs $y_1$ and $y_2$, as shown in Equations 4-6:

$$y_1 = w_1^H x \quad \text{Equation 4}$$

$$y_2 = w_2^H z \quad \text{Equation 5}$$

$$y = \alpha y_1 + (1-\alpha) y_2 \quad \text{Equation 6}$$

As such, when the beamforming coefficient is set to 0, the output audio signal corresponds to using only the second set of acoustic sensors z, which are selected to be free of acoustic feedback. In some embodiments, to avoid artifacts in the convex combination, the beamformer is designed such that the target far-field sound source being beamformed is scaled and aligned in phase consistently in the y and output signals. This can be obtained with a distortionless beamformer where the $y_1$ and $y_2$ steering direction is defined through an acoustic transfer function (or relative transfer function) which is normalized by the same reference microphone. For example, the beamformer may be designed such that the acoustic (or relative) transfer function is computed with respect to a common reference microphone that is in both x and z.

Figure 4:
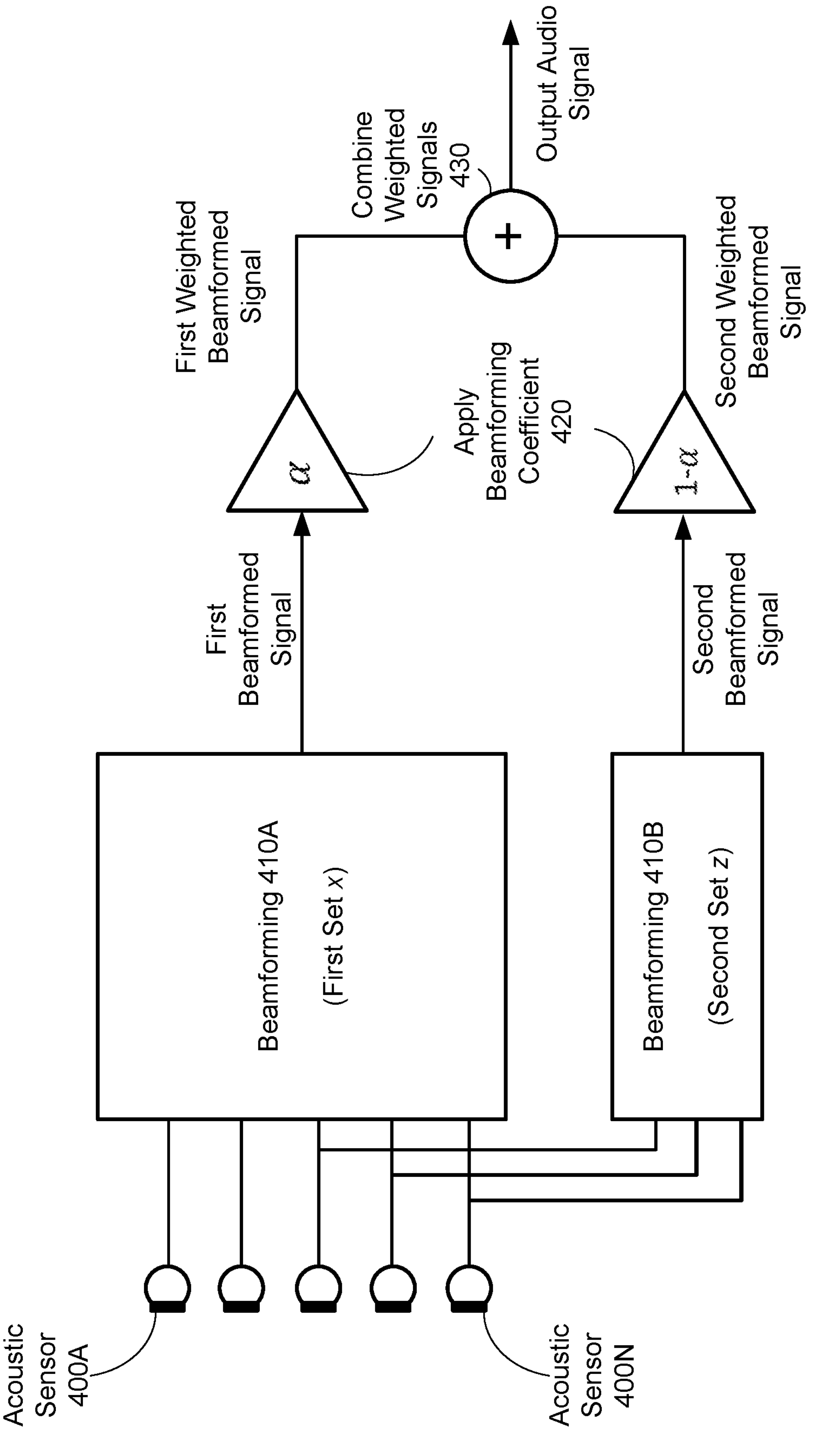
FIG. 4 shows an example of applying a beamforming coefficient to beamforming signals generated from different sets of acoustic sensors, according to one embodiment.

FIG. 4 shows an example of applying a beamforming coefficient to beamforming signals generated from different sets of acoustic sensors, according to one embodiment. This may represent, for example, the processes of far-field beamforming 330 performed by the beamforming module 270 in some embodiments.

The example of FIG. 4 is an example block diagram showing a convex sub-beamforming combination for a set of acoustic sensors 400A-N, in which five acoustic sensors are included in the first set x and a subset of three acoustic sensors is the second set. The first set x may be beamformed with beamforming 410A and the second set z beamformed with beamforming 410B, forming a respective first and second beamformed signals. When a level of acoustic feedback that is below a threshold value (e.g., such that there is functionally no acoustic feedback), the beamforming coefficient α is set to 1. In this manner, the beamforming output from beamforming 410A using the entire acoustic sensor array is used (good performance). Further, in the illustrated example, if the acoustic feedback is detected in the top two microphones, the controller also applies beamforming 410B using the reduced microphone array, and the beamforming coefficient α is set to a value that is less than 1. The beamforming coefficient is applied 420 to yield the respective contributions for each beamformed signal as the first weighed beamformed signal and second weighted beamformed signal and are combined 430 to generate the output audio signal as discussed above.

In cases where there is a lot of acoustic feedback, the beamforming coefficient α may be set to zero such that the beamforming only uses the second set of acoustic sensors (e.g., the reduced microphone array. As discussed above, the beamforming coefficient may also be modified based on the detected feedback, such that the contribution of the first beamformed signal may be increased or decreased to gain the additional information available in the signal without introducing noticeable feedback. As such, in one embodiment the controller may attempt to optimize the beamforming coefficient α by, e.g., starting at zero and then slowing increasing the beamforming coefficient α until acoustic feedback is detected in the combined signal, and then reducing the prior value of a where acoustic feedback was not detected in the combined signal. In this manner, the audio system may be able to leverage some portion of a usable signal out of the full microphone array, which conventionally may be ignored or dropped. When these components are implemented in hardware circuits, the parallel beamforming of beamforming 410A and 410B may also permit the beamforming and combination of the two according to the changing beamforming coefficient to be executed efficiently and in constant time, smoothing the experience for a user when the beamforming coefficient changes.

Returning to FIG. 3, the output beamforming signal may also (or as an alternative) use one or more interaural characteristics 355 (i.e., a difference between sound received by each ear of a user) to enhance target sound (such as speech) with minimal, if any, amplification of the beamforming output signal. That is, output for audio production by the transducers may be modified to adjust an interaural characteristic that improves perception and audibility of the beamformed signal to a user. Improving perception in a way that doesn't require significant amplification may reduce the likelihood of acoustic feedback occurring and reduces the likelihood of an unpleasant experience for the user. This change benefits from an increase in perception that may be characterized as a masking level difference between a signal and noise due to the interaural distinction between signal and noise. Masking level difference is a psychoacoustic phenomenon in which the detection (e.g., perception) or recognition of a monaural or binaural signal presented to the two ears is improved in the presence of contrasting noise (i.e., competitive binaural noise). This may be done by maximizing differences between the interaural characteristics of the target sound (i.e., as represented in the beamforming output) and the interaural characteristics of the noise.

As one example, when environmental noise in a local area is generally fully coherent (e.g., appears at the same time to both ears), signal perception is improved by modifying the coherence of the signal relative to the environmental noise to increase contrast in coherence between the two. Thus, for noise that appears in-phase with complete coherence between the two ears (noise that arrives simultaneously at each ear in-phase with a coherence of one), the beamformed sound (e.g., speech) may be better perceived by a hearer with the phase inversed in one of the ears (i.e., with a coherence of zero). Thus, to improve the perception of the beamformed signal, the acoustic feedback 340 may also determine an interaural characteristic 355 of the local area and modify the beamformed signal to apply an interaural enhancement 360 to the beamformed signal, increasing an interaural difference with the environmental noise and improving a user's perception of the beamformed signal.

In this respect, the beamforming module 270 may be configured to determine one or more interaural characteristics of the detected sound in an environment, which may be, e.g., interaural level differences, interaural phase/time differences, or interaural coherence. The controller may be configured to determine one or more corresponding interaural characteristics of the output audio signal, which may include broadband interaural characteristics as well as frequency-dependent interaural characteristics. The controller may be configured to modify an output audio signal to increase a difference, and in some cases maximize the differences, in the one or more interaural characteristics of the output audio signal relative to the corresponding one or more interaural characteristics of the detected sound or noise in the environment. For example, if the interaural characteristic is interaural coherence—and the detected sound or noise is incoherent (e.g., out-of-phase with respect to the user's ears)—the audio controller may modify the output audio signal (e.g., beamformed speech) to be fully coherent (e.g., in-phase with respect to the production by transducers associated with each of the user's ears). The audio controller may have the speaker array present the modified output audio signal to the user. This modification may result in a perceived amplification for the user (e.g., 3 to 15 dB of gain), without actual physical amplification of the modified output signal.

Figure 5:
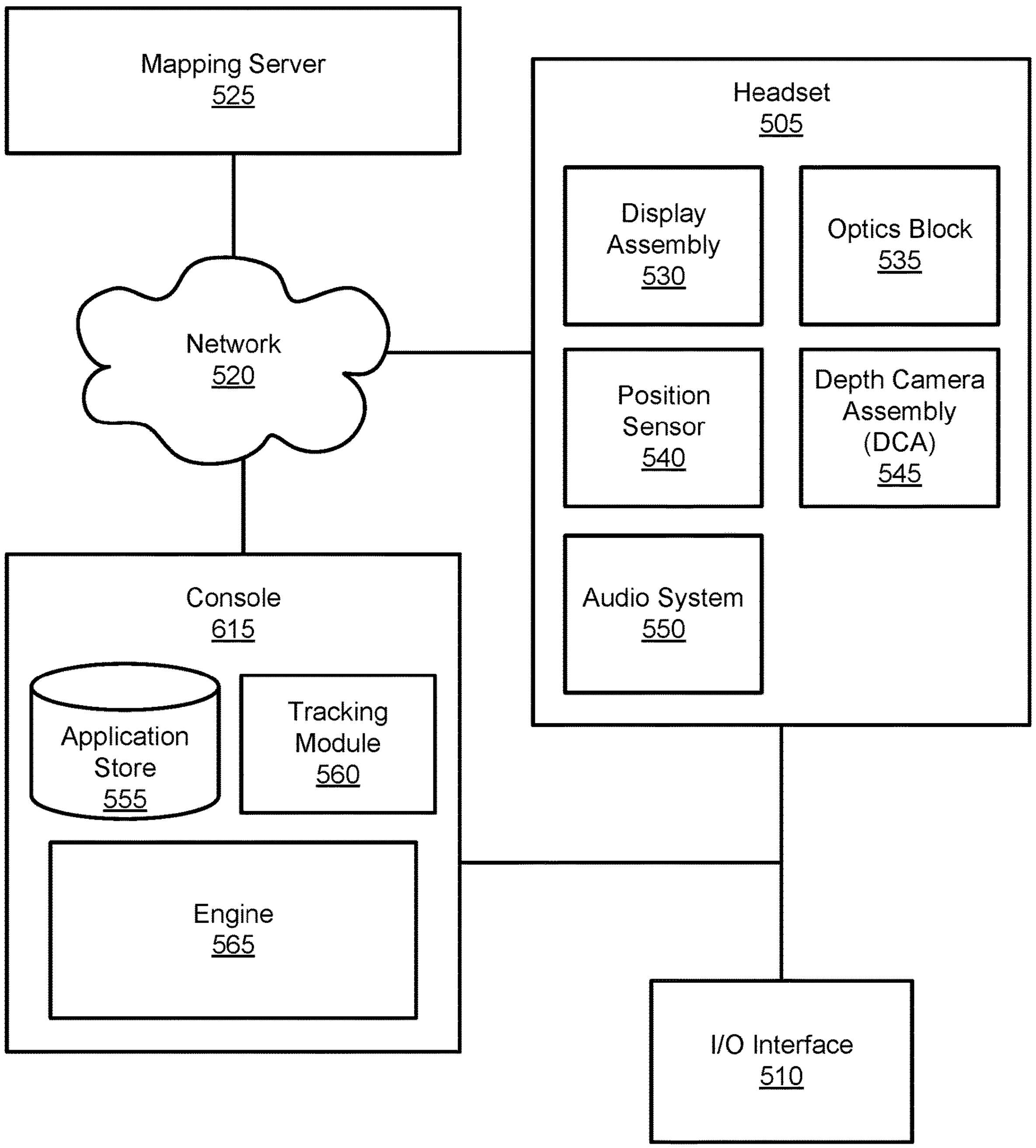
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

detecting sound using acoustic sensors;

beamforming the sound detected by a first set of the acoustic sensors to form a first beamformed signal;

beamforming the sound detected by a second set of the acoustic sensors to form a second beamformed signal;

weighting the first beamformed signal and the second beamformed signal according to a beamforming coefficient to mitigate acoustic feedback; and combining the first weighted beamformed signal and the second weighted beamformed signal to form an output audio signal.

2. The method of claim 1, wherein the second set is a subset of the first set of the acoustic sensors, the method further comprising selecting the subset based on feedback from the first set of the acoustic sensors being below a threshold value.

3. The method of claim 1, further comprising sending the output audio signal to a transducer array that generates sound output.

4. The method of claim 1, further comprising determining an amount of feedback received by one or more of the acoustic sensors and setting the beamforming coefficient based on the amount of feedback.

5. The method of claim 4, wherein the beamforming coefficient is dynamically adjusted to maximize a weight of the first beamformed signal that keeps the amount of feedback below a threshold feedback level.

6. The method of claim 4, wherein the beamforming coefficient is set by increasing a weight of the first beamformed signal until the feedback reaches a threshold feedback level.

7. The method of claim 1, wherein the first beamformed signal and the second beamformed signal each beamform audio content from a common sound source in a local area of the acoustic sensors.

8. The method of claim 1, further comprising:

determining an interaural characteristic of the detected sound; and modifying the output audio signal to increase a difference in an interaural characteristic of the output audio signal relative to the interaural characteristic of the detected sound.

9. The method of claim 8, wherein the interaural characteristic is a coherence of the detected sound.

10. The method of claim 8, wherein modifying the output audio signal comprises changing a phase of the output audio signal with respect to the detected sound.

11. An audio system comprising:

a sensor array having acoustic sensors configured to detect sound from a local area;

a controller configured to:

beamform the sound detected by a first set of the acoustic sensors to form a first beamformed signal;

beamform the sound detected by a second set of the acoustic sensors to form a second beamformed signal;

weight the first beamformed signal and the second beamformed signal according to a beamforming coefficient to mitigate acoustic feedback; and combine the first weighted beamformed signal and the second weighted beamformed signal to form an output audio signal; and a transducer array configured to generate acoustic waves from the output audio signal.

12. The audio system of claim 11, wherein the second set is a subset of the first set of the acoustic sensors, the controller further configured to select the subset based on feedback from the first set of the acoustic sensors being below a threshold value.

13. The audio system of claim 11, wherein the controller is further configured to send the output audio signal to the transducer array.

14. The audio system of claim 11, wherein the controller is further configured to determine an amount of feedback received by one or more of the acoustic sensors and set the beamforming coefficient based on the amount of feedback.

15. The audio system of claim 14, wherein the beamforming coefficient is dynamically adjusted to maximize a weight of the first beamformed signal that keeps the amount of feedback below a threshold feedback level.

16. The audio system of claim 14, wherein the beamforming coefficient is set by increasing a weight of the first beamformed signal until the feedback reaches a threshold feedback level.

17. The audio system of claim 11, wherein the first beamformed signal and the second beamformed signal each beamform audio content from a common sound source in the local area of the acoustic sensors.

18. The audio system of claim 11, wherein the controller is further configured to:

determine an interaural characteristic of the detected sound; and modify the output audio signal to increase a difference in an interaural characteristic of the output audio signal relative to the interaural characteristic of the detected sound.

19. The audio system of claim 18, wherein the interaural characteristic is a coherence of the detected sound.

20. The audio system of claim 18, wherein the controller is further configured to modify the output audio signal, further comprising changing a phase of the output audio signal with respect to the detected sound.

* * * * *